United States Patent
Oakes et al.

(10) Patent No.: US 7,513,773 B1
(45) Date of Patent: Apr. 7, 2009

(54) METHOD AND SYSTEM FOR CREATING TRUE PERSPECTIVE DRAWINGS AND DRAWINGS CREATED BY SAME

(76) Inventors: Trevor Oakes, 118 E. 18th St. #4, New York, NY (US) 10003; Ryan Oakes, 118 E. 18th St. #4, New York, NY (US) 10003

(*) Notice: Subject to any disclaimer, the term of this patent is extended or adjusted under 35 U.S.C. 154(b) by 417 days.

(21) Appl. No.: 11/343,518

(22) Filed: Jan. 30, 2006

Related U.S. Application Data (60) Provisional application No. 60/648,053, filed on Jan. 28, 2005.

(51) Int. Cl.
G09B 11/00 (2006.01)
(52) U.S. Cl. .......................................................... 434/91
(58) Field of Classification Search .................. 434/81, 434/84, 85, 88, 89, 90, 91, 92; 33/276, 277
See application file for complete search history.

(56) References Cited

U.S. PATENT DOCUMENTS

| | | | | |
|---|---|---|---|---|
| 9,409 | A * | 11/1852 | Richter | 434/88 |
| 254,178 | A * | 2/1882 | Perk Van Lith | 33/277 |
| 989,240 | A | 4/1911 | Folmer | |
| 1,150,550 | A | 7/1915 | Snyder | |
| 1,514,296 | A * | 11/1924 | McCallum | 33/277 |
| 2,418,286 | A * | 4/1947 | Austin | 434/85 |
| 2,571,613 | A * | 10/1951 | Rissland | 434/91 |
| 2,796,666 | A * | 6/1957 | Liebowitz | 33/262 |
| 3,678,589 | A * | 7/1972 | Baier | 33/277 |
| 4,008,528 | A * | 2/1977 | Caulfield | 434/91 |
| 4,379,364 | A * | 4/1983 | Fish | 33/277 |
| 4,432,140 | A | 2/1984 | Santamaria Ulecia | |
| 4,457,717 | A * | 7/1984 | Chika | 434/88 |
| 5,100,325 | A * | 3/1992 | Cutler | 434/91 |
| 5,580,250 | A * | 12/1996 | McKewen | 434/191 |
| D379,371 | S * | 5/1997 | Nicholl et al. | D19/35 |
| 5,684,937 | A | 11/1997 | Oxaal | |
| 5,903,782 | A | 5/1999 | Oxaal | |
| 5,936,630 | A | 8/1999 | Oxaal | |
| 6,118,454 | A | 9/2000 | Oxaal | |
| 6,157,385 | A | 12/2000 | Oxaal | |
| 6,243,099 | B1 | 6/2001 | Oxaal | |
| 6,252,603 | B1 | 6/2001 | Oxaal | |
| 6,271,853 | B1 | 8/2001 | Oxaal | |
| 6,323,862 | B1 | 11/2001 | Oxaal | |

* cited by examiner

*Primary Examiner*—Kurt Fernstrom
(74) *Attorney, Agent, or Firm*—Pryor Cashman LLP; Barry E. Negrin, Esq.

(57) ABSTRACT

A method and system for creating perspective drawings on a preferably curved drawing surface. An easel and a drawing surface are provided. The artist securely positions his head at a central point relative to the drawing surface and looks past an edge of the drawing surface at an object to be drawn, thereby creating an illusion of a transparent margin of the drawing surface overlapping the object. The object is then traced onto the transparent margin of the drawing surface. The traced-upon margin is cut off and removed from the drawing surface, thereby creating a new transparent margin. These steps are repeated on the new transparent margin until all of the drawing surface is used. The cut-up pieces of the drawing surface are reassembled to form a complete image. The easel includes structure that allows the artist to position an eye at the center point of the drawing surface.

24 Claims, 5 Drawing Sheets

Metal Strips 17 Disassembled

Fig. 5
Top View

Fig. 6A
Front View

Fig. 6B
Front View

Fig. 7A
Top View

Fig. 7B
Front View

Fig. 7C
Front View

METHOD AND SYSTEM FOR CREATING TRUE PERSPECTIVE DRAWINGS AND DRAWINGS CREATED BY SAME

RELATED APPLICATIONS

Domestic priority is claimed from U.S. Provisional Patent Application No. 60/648,053 filed Jan. 28, 2005.

BACKGROUND OF THE INVENTION

1. Field of the Invention

The invention relates to perspective drawing methods and devices. More specifically, the invention relates to an on-site method allowing the artist to capture the perspective of the space in front of him exactly as it is seen by his eyes.

2. Description of Related Art

Artists have been attempting to render perspective drawings of objects for centuries. The most common practice is using the geometrical rules of 'linear perspective' invented by Filippo Brunelleschi in the $15^{th}$ century. This method is done on flat paper and involves using a straight edge and a vanishing point on the horizon line towards which everything in the artist's view diminishes. All drawn objects shrink along straight lines that converge at the vanishing point to give the allusion of space receding into the distance. However, linear perspective is only a close approximation to how space is perceived by the eye. It does not recreate the exact way in which objects appear to diminish as they move into the distance.

Some attempted advances have been put forth over the years, including those described in U.S. Pat. Nos. 4,008,528 to Caulfield, 4,432,140 to Santamaria Ulecia, and 5,100,325 to Cutler.

The Cutler patent teaches a kit having an eyepiece and a transparent window onto which the artist draws directly. That is, the artist looks through the eyepiece with one eye open and draws on the window, or on a clear plastic overlay placed over the window. A similar system is taught in the Caulfield patent, which employs a clear curved surface as the drawing surface. Again, as with Cutler, one looks through an eyepiece with only one eye open and draws onto the clear structure. If desired, one may later place a piece of paper over the clear structure and attempt to trace the initial drawing onto the paper. Santamaria Ulecia teaches a device having a flat transparent portion and a flat opaque portion adjacent thereto. One looks through the transparent portion, again with one eye, and draws what one sees onto the adjacent opaque portion.

In all of these systems, one eye is kept closed while a single open eye looks through a transparent surface and enables the scene beyond it to be traced. The consideration of optically perceived space in these systems is limited to investigating only how light rays are taken in by a single eye. Thus, a system that takes into consideration how our brains perceive space with two eyes working in tandem comes as an innovation. There is a long-felt need for a system that documents true perspective relationships as they are seen by the binocular human optical system—a system that creates scientifically accurate drawings that can be used as tools to understand how space manifests to our two eyes.

SUMMARY OF THE INVENTION

The above and other objectives are achieved by the invention, which includes a system and method for creating perspective drawings, as well as a drawing made by the inventive process.

In one embodiment, the invention is a system for creating perspective drawings on a spherical surface having an easel having a radially symmetric curvature about a center point (i.e., spherical) and a concave drawing surface adapted to fit inside the curvature of the easel. A head stabilizer is disposable in proximity to the easel for positioning one of an artist's eyes at or near the center point of the easel. When the artist's eye is positioned at or near the center point and the artist looks next to the drawing surface and easel at an object in the distance past the drawing surface and easel, an illusion of a transparent margin of the drawing surface overlaps the object to enable tracing of the distant object onto a real side margin of the drawing surface.

Preferably, the inventive system includes means for manually locating the center point. Such means may preferably include at least one locating element perpendicular to the curvature, wherein when the artist places his eye at the center point, only an edge of the locating element is substantially visible. The locating element may preferably include a grid of strips of material (at least two strips is preferred) perpendicular to the curvature. Manual eye position calibration is achievable by aligning one's eye so that only edges of the strips are visible from the center point.

Preferably, the drawing surface includes substantially flat surface elements which, when assembled, form the concave drawing surface with substantially the same curvature as easel. In one embodiment, the surface elements are curved longitudinal strips. Alternatively, the surface elements can be interlocking polygons. As another alternative, the drawing surface may be formed as a single curved piece of material.

The head stabilizer may be a chin rest and may further include a head clamp to secure the artist's head to the chin rest. In addition or in the alternative, the head stabilizer may include a bite plate graspable by the artist's jaws.

The invention also includes a method of creating perspective drawings on a drawing surface. An easel and a drawing surface are provided. The artist then securely positions his head relative to the drawing surface. The artist looks past an edge of the drawing surface at an object to be drawn and thereby creates an illusion of a transparent margin of the drawing surface overlapping the object. The artist then traces the object onto the transparent margin of the drawing surface, which corresponds to a real side margin of the drawing surface. Once the side margin is sufficiently drawn upon, the artist cuts off or otherwise removes the traced-upon margin on the drawing surface, thereby creating a new transparent margin, and he repeats the process on the new transparent margin. These steps are repeated until all (or the entire desired portion) of the drawing surface is used. The cut-up pieces of the drawing surface are then reattached to form a complete image.

The drawing surface provided is preferably (but not necessarily) a concave drawing surface having radially symmetric curvature (i.e., spherical) about a center point, and the artist positions one of his eyes substantially at the center point of the concave drawing surface.

Preferably, a means for manually locating said center point is provided so the artist can quickly and easily determine when his head is properly situated at or near the center point of the easel/drawing surface. In a preferred embodiment, the center point locating means comprises at least one locating element perpendicular to the curvature, so that when the artist places his eye at the center point, only an edge of the element is substantially visible. (The converse being that, when the artist positions his head so that only the edge of the element is visible from his vantage point, he knows he is at or near the center point of the drawing surface.) More preferably, the locating element includes a grid of strips of material perpendicular to the curvature.

Also, the invention includes a true perspective curved-surface manual drawing, including a drawing surface having a radially symmetric curvature about a center point made initially of substantially flat surface elements which, when assembled, form the concave drawing surface. The concave drawing surface is drawn upon one side margin strip at a time, the side margin strip being removed from the drawing surface upon completion of the drawing on that strip to create a new side margin. When the entire drawing surface is removed and drawn upon as strips, the removed side margin strips are reassembled to form the curved surface manual drawing. The artist drawing upon the side margin strips positions his eye at the center point of the drawing surface and looks past the drawing surface to the object being drawn, thereby forming a transparent margin of the drawing surface overlapping the object and upon which the object is traceable.

DETAILED DESCRIPTION OF THE INVENTION AND THE DRAWINGS

Description of the invention will now be given with reference to the attached FIGS. 1-7C. It should be noted that these drawings are exemplary in nature and in no way serve to limit the scope of the invention, which is defined by the claims appearing hereinbelow.

Ghost Images the Concept Exploited to Achieve the Drawing

Figure 5:
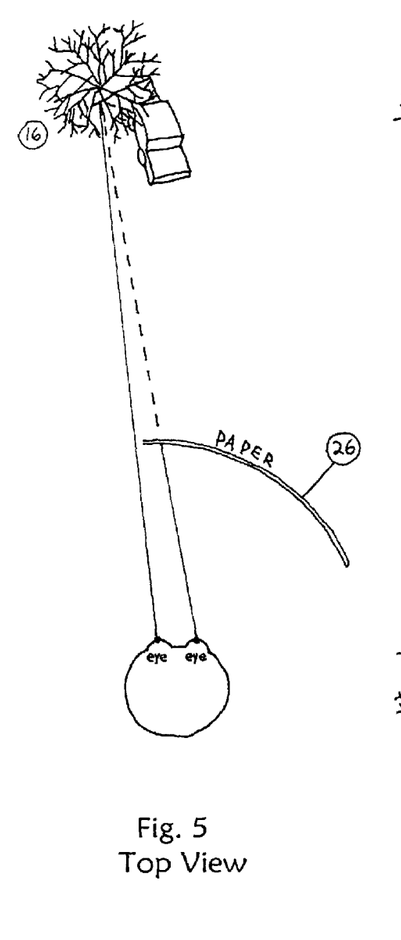
FIG. 5 is a top elevation conceptual view of the artist's line of vision when drawing a distant object in accordance with the inventive method.
Figure 6A:
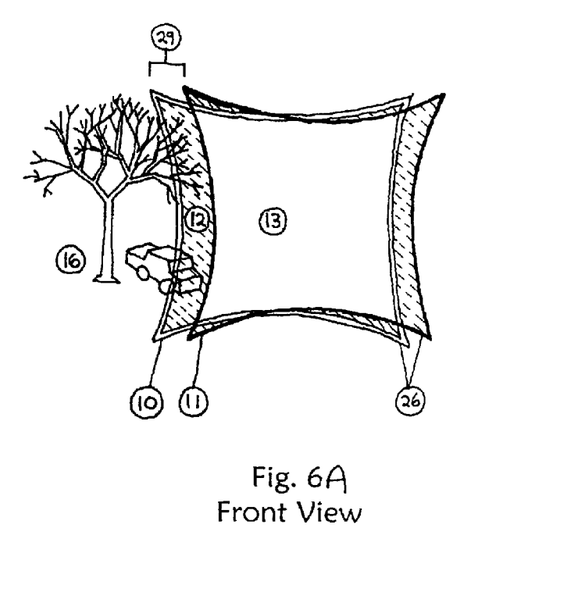
FIG. 6A is a front elevation conceptual view of the artist's line of vision when drawing a distant object in accordance with the inventive method.
Figure 6B:
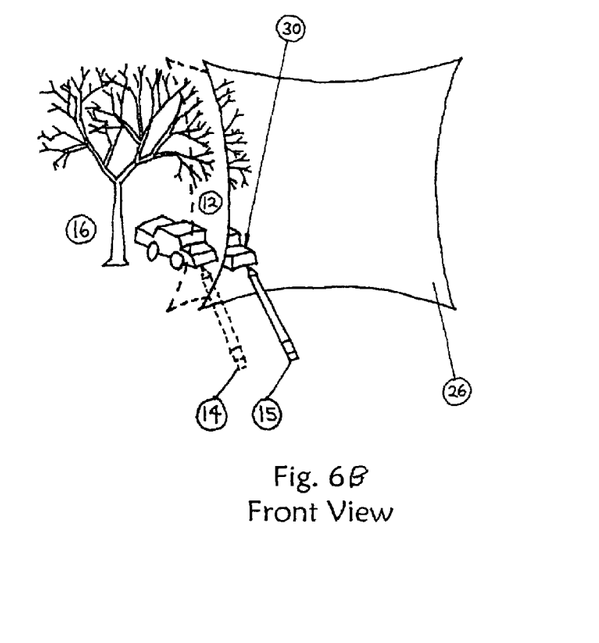
FIG. 6B is a front elevation conceptual view of the artist drawing on the transparent window of the drawing surface when drawing a distant object in accordance with the inventive method.

Because humans see the world through two eyes, there is an optical effect occurring when you look at an object in the far distance and, simultaneously, another object exists in your line of sight (see FIG. 5) but closer than the "far distant object" 16—the closer of the two objects 26 appears as a double image (see FIG. 6A). For example, if you are looking across the table at a person's face and simultaneously put a pencil in your line of sight, you will see two pencils, side by side. And both pencils will appear transparent. The phenomenon of the closer object separating into two transparent images is the key concept exploited by this drawing system.

When the closer of the two objects shifts into double images these two images are approximately 2.5 inches apart, a distance limited to the distance between a person's two eyes (i.e., approximately 2.5 inches).

System Components

1. An Easel-Like Apparatus Formed into the Shape of a Sphere's Crust or Skin 22

This dish-easel 22 supports a drawing surface 26 designed so that every point on the drawing surface 26 is equidistant from the center point of the sphere implied by the dish-easel 22.

Figure 1A:
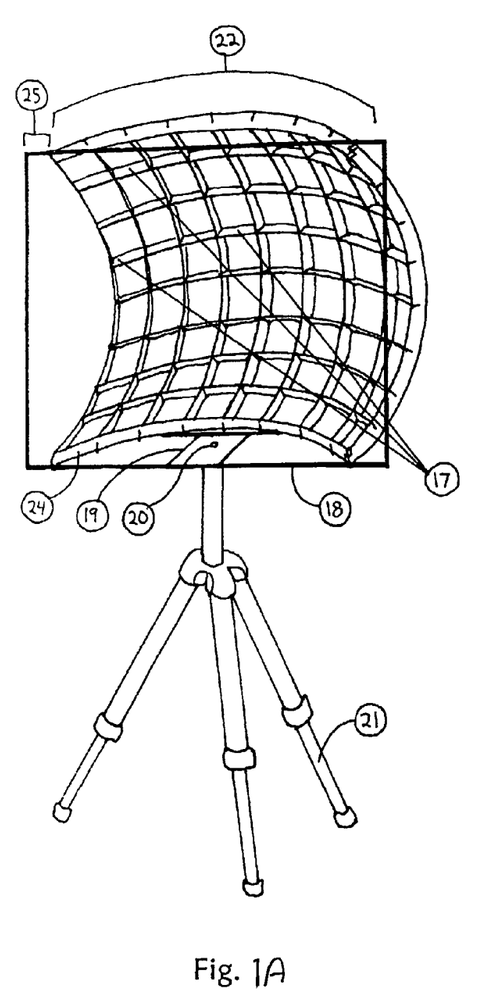
FIG. 1A is a perspective view of an easel in accordance with the invention.
Figure 1B:
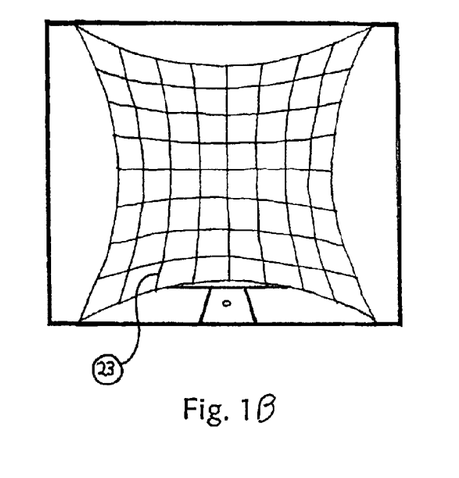
FIG. 1B is a front elevation view of the easel of FIG. 1A in accordance with the invention.

The dish-easel 22 can be fabricated in numerous ways providing the following criteria are met: it must remain rigid; it must be securely fixed in place and be non-moveable; finally, when looking through the dish-easel 22 with your eye positioned at the center of its implied sphere, the dish-easel 22, much like a window, must be transparent as in FIG. 1B.

Our dish-easel 22 is preferably a grid constructed of 1" wide 25-gauge sheet metal strips 17 each of which stands perpendicular to the curvature of the surface of the sphere. As a result, when viewed from the center point FIG. 1B of the sphere, the artist sees only the thin edge of the sheet metal strips 23, not their broad surfaces 24.

Additionally, our dish-easel 22 has a rectangular frame 18 made of steel angle irons that surrounds the sheet metal grid 17 and adds rigidity. This frame 18 extends a minimum distance 25 of 2.5" to the left and right of the sheet metal grid 17. It is crucial that this 2.5" distance 25 be greater than the width between the artist's eyes. There is also a base plate 19 with a ¼ threaded hole 20 permitting it to be mounted on a commercial tripod 21. The grid portion 17 of the apparatus could also be made of glass, clear plastic, rigid wire, screening, thin wood, a variety of plastics, or other suitable materials provided they fulfill the criteria stated above. There is, however, an advantage to using perpendicularly oriented sheet metal strips as we have done. It's easier to locate the center point of the sphere by eye without using any tools or measurements. As described above, if the artist looks through the dish-easel 22 from the center of the sphere he will see only the edge 23 of the sheet metal strips 17. If the artist moves at all off-center he will begin to see the broad surface 24 of some of the sheet metal strips 17. This will alert him that his vantage point is off-center.

A description of how to build this dish-easel 22 is included below.

2. A Concave Drawing Surface 26 Molded to Fit Inside the Dish-Easel 22.

Currently we use paper as our drawing surface. Any drawing surface from canvas to velum to fresco plaster would work, but paper is particularly suitable because it is compatible with commercial pens and pencils, and it's the most common surface for drawing. If the artist were interested in painting in the drawing after its completion a material suitable for paint should be used.

Figure 2A:
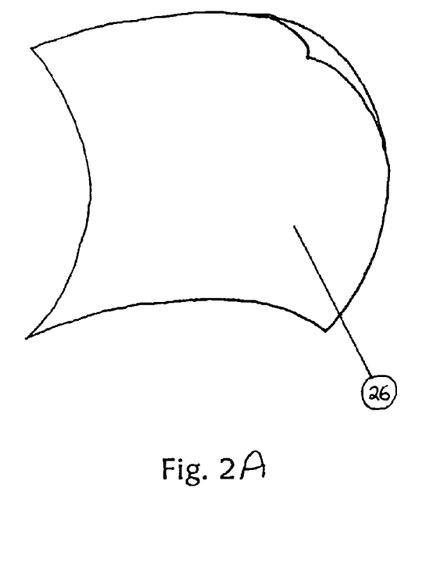
FIG. 2A is a perspective view of a drawing surface in accordance with the invention.

We have several methods to form paper (and similar materials) into a skin that will rest on the dish-easel 22. From flat paper we have calibrated curved strips (FIG. 2B) that approximate the crust of a sphere when taped together. These curved strips (FIG. 2B) were calibrated directly from the inside edge of the metal strips 17 to insure a proper fit. One could also use mathematics to calculate the curvature of these strips of FIG. 2B. With mathematics one could also calculate pie wedge shapes from flat paper FIG. 2C and also achieve an approximate sphere. Or, like a soccer ball, a combination of hexagons and pentagons or other interlocking polygons could be used. Moist paper pulp could also be cast over a spherical object and molded during the paper-production phase.

Figure 2B:
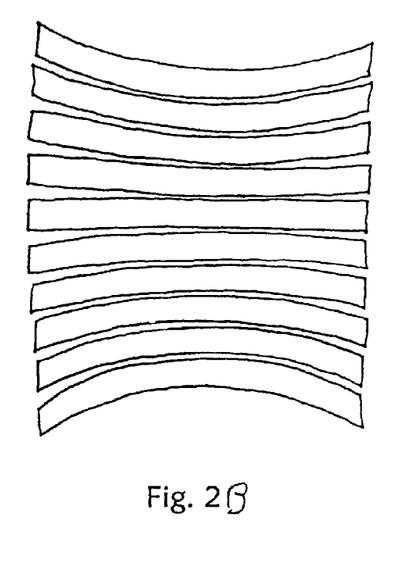
FIG. 2B is a front elevation view of a series of curved longitudinal strips forming a curved drawing surface in accordance with the invention.
Figure 2C:
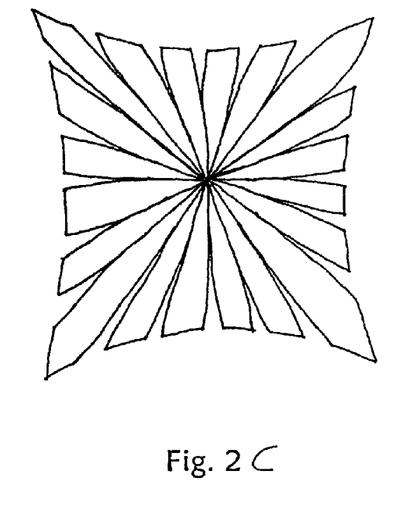
FIG. 2C is a front elevation view of a number of differently shaped elements forming a curved drawing surface in accordance with the invention.

We prefer curved strips of paper as shown in FIG. 2B for reproduction purposes. After a drawing is completed on the paper in its spherical form 26 (see FIG. 2A), the strips can be unattached and laid flat FIG. 2B. At this point they can be digitally photographed or scanned and printed flat on a commercial printer. They can then be cut out and reassembled in a spherical form. The same reproduction process could be done using pie wedges (FIG. 2C) or hexagons and pentagons or other interlocking polygons or other shapes, although after printing the task of cutting out and reassembling these shapes would be more time consuming, there are simply more edges to deal with.

A more detailed description of how we calibrated the curved strips of paper FIG. 2B is included below.

3. A Head-Stabilizing Device 27 Designed to Hold the Artist's Head Firmly in Place.

Figure 3:
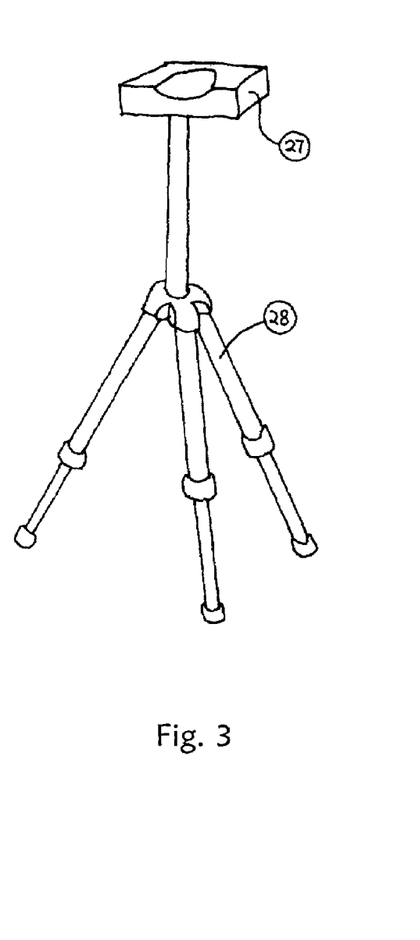
FIG. 3 is a perspective view of a head stabilizer in accordance with the invention.

The head-stabilizing device 27 must be situated so it stations either the artist's right or left eye at the sphere's center. To be more precise the head-stabilizer 27 stations the artist's eye socket at the sphere's center. The eyeball is still allowed to pivot within the eye socket.

The head-stabilizing device 27 could be fabricated in various ways as long as it stabilizes and prevents movement of the artist's eye socket. Also, because the eye can only pivot so far within its socket the head-stabilizing device 27 needs to be able to rotate while maintaining the location of the eye socket, thus allowing the head to pivot about the socket, so the artist can see the right and left side of the drawing surface (paper) 26. We use a chinrest 27 mounted on a commercial tripod 28 with a rotating tripod head. Although a chinrest 27 alone does not stop the artist's head from slight motion within the chinrest 27 and consequently does not completely immobilize the eye socket, we have been able to overcome slight eye socket mobility by insuring that the artist always realign his vantage point with the sheet metal strips 17 of the dish-easel 22 before beginning to draw. As mentioned earlier the sheet metal strips 17 are arranged perpendicular to the sphere's surface; therefore, if the artist moves his vantage point off-center, he will begin to see the broad surface 24 of the sheet metal strips 17, not just their edges 23. A head clamp similar to the ones used by eye doctors mounted on a rotating tripod that completely immobilized the artist's head by literally clamping it in place would work even better.

Method

The artist first must decide which of his two eyes he will use—the right or the left—to position at the center of the sphere.

Figure 4:
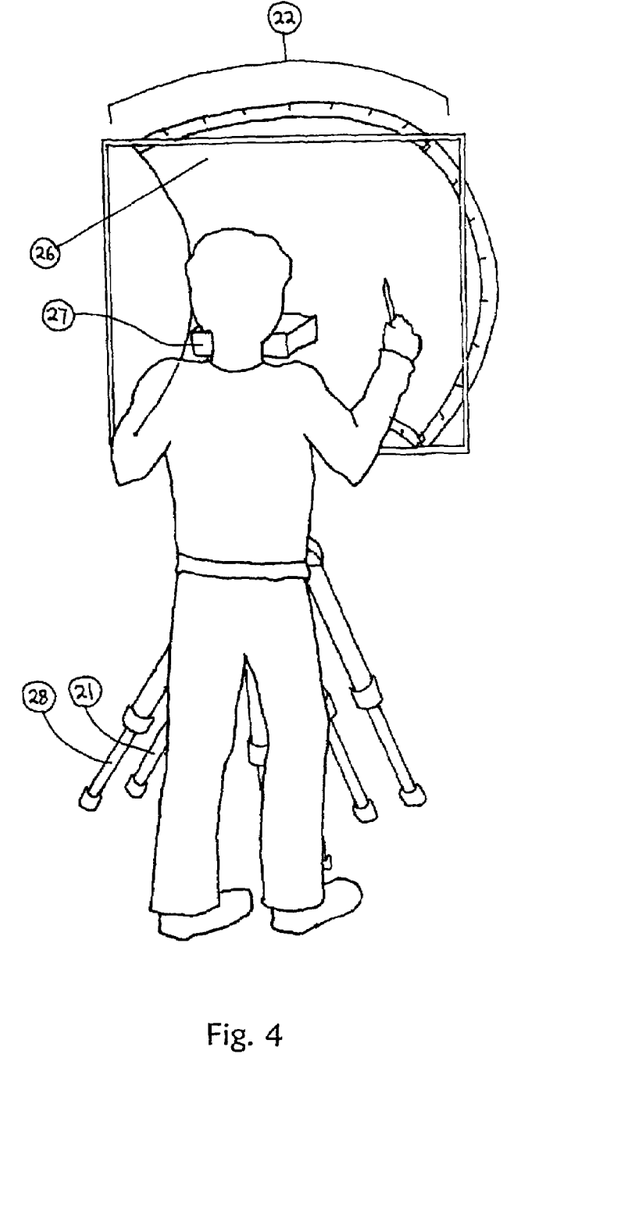
FIG. 4 is a perspective view of an artist using the easel, drawing surface, and a head stabilizer in accordance with the invention.

Once the artist's chosen eye socket is held by the head-stabilizing device 27 at the center of the spherical paper 26, and the paper 26 is securely attached to the dish-easel 22 (as illustrated in FIG. 4), the method follows as such:

If the left eye is chosen, the artist now looks at the left edge of the paper 26 with both eyes open FIG. 5 (substitute right for left in all instances if the right eye is selected). Rather than focusing on the paper's 26 left edge, the drawer looks beyond the edge to focus on whatever lies in the distance 16 along the edge of the paper 26.

The blank paper 26 will now separate into two images 10, 11.

The image of the paper appearing on the left 10 is seen with the right eye. The image of the paper appearing on the right 11 is seen with the left eye. Because a person's eyes are approximately 2.5" apart, the distance 29 the two images 10, 11 can separate will be no greater than 2.5" and will vary depending on how far the object in the distance 16 actually is from the drawing paper 26 (the closer the object, the smaller the separation 29).

The separation distance 29 varying in respect to the focus depth causes an effect in the finished drawing. The effect is discussed in detail below.

If the paper 26 is wider than the shifted distance 29, the two images 10, 11 of the drawing paper will overlap 13. The portions of the drawing paper that overlap 13 will remain opaque; any portion of the drawing paper that does not overlap will create a transparent margin 12.

Because of this phenomenon, the entire left margin of the drawing surface appears as transparent margin 12 when the artist looks past the left margin to focus on the distant objects 16.

While remaining focused on the object in the distance 16 the artist can now raise a drawing instrument (pencil, pen, etc.) to the transparent margin 12. Like the drawing paper 26, the drawing instrument will appear in duplicate 14, 15.

The artist now touches the pen to the paper and uses the left image of the drawing instrument 14, which appears in front of the transparent margin 12, to trace the contours of the distant objects 16 that can be seen through the transparent margin 12. These traced lines 30 are left on the paper 26 and are in perfect proportion to the actual objects in the distance 16; the perspective that is captured 30 is true to life. After tracing in all the distant objects 16 seen through the transparent margin 12, that margin of the drawing paper 26 is cut off, e.g., with a razor blade, removed, and set aside.

The process is then repeated, this time looking at the new left edge of the paper, then focusing on what's beyond it, thereby creating a new transparent margin and finally tracing onto that margin what is seen through it. When completed, this second margin is trimmed off too. This process is continuously repeated with each new left edge until the entire piece of drawing paper 26 (or the entire desired portion thereof) has been drawn on, removed with a blade, set aside, and no paper remains.

At this point, all the trimmed margins are laid face down and taped back together. After reassembly, if the viewer places his eyes in the center of the sphere, the drawn image will recreate a view identical to the one seen by the artist at the time of creation.

Even if the viewer does not place his eyes in the exact center of the sphere, the perspective and the sense of depth will look astonishingly accurate.

This tracing method could be performed on any shape of paper (standard flat rectangular paper, inside a cone, inside a cube, on the convex side of a sphere, etc.). It is preferred to create true perspective drawings on the concave side of a sphere with the artist's eye at the sphere's center. That way, every point on the paper is equidistant from the artist's eye.

This eliminates distortion and proportions remain uniform. Furthermore, a curvilinear surface is in truer harmony with the human visual system than a flat plane of paper.

Effect of Shift Distance 29 (Transparent Margin Width 29) Varying in Respect to Focus Depth In order for a viewer to achieve focus on an object 16 he must make the sightline from each of his eyes intersect at that object 16. Even though this drawing method does not actually allow the artist's right and left sightlines to intersect on the objects in the distance 16 (the paper 26 blocks the view of the right eye) the brain still attempts to make the sightlines intersect on those objects 16. So when the artist places his head in the head-stabilizer 27, and focuses not on the paper 26 but on the objects in the distance 16, he is choosing to match his sightlines on the objects in the distance 16 instead of on the paper 26. His sightlines are now separated at the paper surface 26. This separation causes the paper to appear as two separate images 10,11 and effectively creates the transparent margin 12. Furthermore, the width of sightline separation at the paper surface 26 determines the width of the transparent margin 29. More specifically, transparent margin width 29 is equivalent to sightline separation.

Figure 7A:
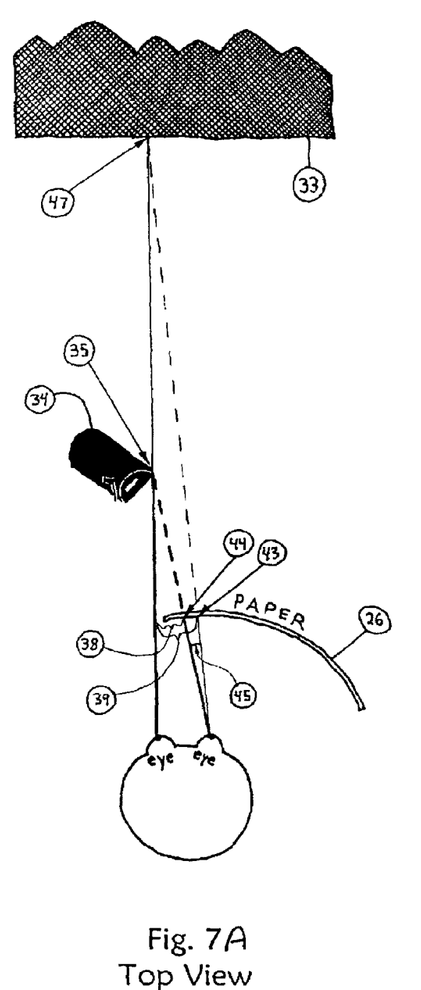
FIG. 7A is a top elevation conceptual view of the artist's line of vision when drawing a distant object and a not-so-distant object in accordance with the inventive method.

In FIG. 7A, that distance between the right and left sightlines measured at the surface of the drawing paper 26 is shown twice as distances 38, 39. Distance 38 measures the distance between the sightlines when the artist is focusing on the mailbox 34, and distance 39 measures the distance between the sightlines when the artist is focusing on the mountains 33. As seen by these distances 38 and 39, the width of the transparent margin 29 (which is equal to the respective distances 38 and 39 between the sightlines) will vary depending on how far the focused-upon object 33,34 is from the artist. Focusing on an object in the far distance 47 like the mountain range 33 will cause the transparent margin width 29 to be nearly its maximum distance of approximately 2.5"distance 39. Focusing on an object closer 35 than the mountain range 33, like the mailbox 34, will cause a transparent margin width 29 measuring approximately two-thirds the size of that caused by the mountain range. The farther away the object in focus, the greater the distance will be between the left and right sightlines, and the larger the transparent margin width 29 will be.

Figure 7B:
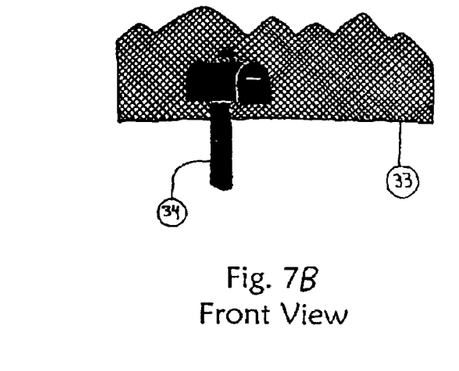
FIG. 7B is a front elevation conceptual view of the artist's vision when viewing objects to be drawn.
Figure 7C:
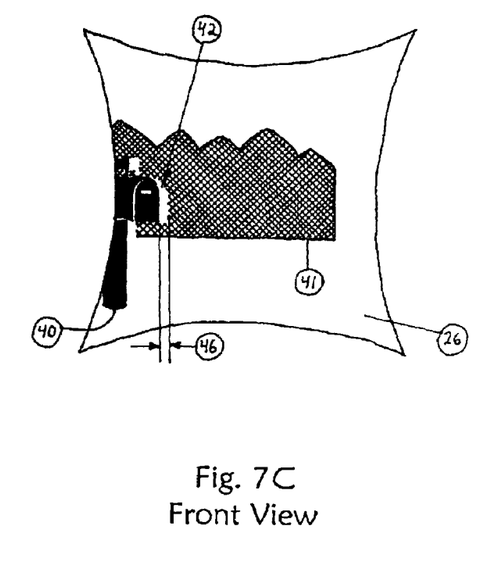
FIG. 7C is a front elevation conceptual view of the artist's drawing on the drawing surface when drawing the distant object and a not-so-distant object of FIG. 7B in accordance with the inventive method.

The varying transparent margin width 29 produces a tangible effect 42 in the final drawing FIG. 7C at those locations where two objects at different focal depths 33, 34 are visually adjacent to one another FIG. 7B.

At those locations there will be a displacement 42 between where the image of each object 40, 41 is drawn. The image of the closer object 40 will appear to have shifted left. A sliver of blank paper 42 will be visible between the edge of the closer object 40 and the corresponding edge of the farther object 41.

The displacement or offset 42 occurs because the image of the object being focused on (either the closer 35 or the more distant 47) gets traced onto the paper 26 at the location where the right eye sees it—i.e. where the right eye's sightline intersects the paper's surface 43, 44. Consequently, when two objects are visually adjacent FIG. 7B but actually at different focal depths, the right eye's sightline will intersect the paper's surface at different locations 43, 44 depending on which of the objects 33, 34 the right eye is attempting to direct its sightline towards. If the left eye is focusing on the very edge 35 of the mail box 34, it need only pivot a minuscule amount to change its focus point from the edge of the mailbox 35 to a visually adjacent location 47 on the mountain range 33. The right eye must pivot an additional angle 45 to change its focus point accordingly.

As an example: imagine the artist is focusing his left eye on the edge 35 of the mailbox 34 and the transparent margin width 29 is two-thirds its maximum distance (only 1.66"). He traces the mailbox 34 onto the paper 26 and then looks at the portion of the mountain range 33 appearing directly adjacent 47 to the mailbox 34. Immediately the left image of the paper 10 shifts further left and the transparent margin width 29 increases to almost its maximum distance (2.5"). The artist begins to shade in the mountain range image 41 but because the left image of the paper 10 has shifted further to the left (with the mailbox image 40 on it) the edge of the mountain range image 41 no longer meets the edge of the mailbox image 40 and blank paper 42 having an offset distance 46 appears between the mailbox image 40 and the mountain range image 41. In the final drawing, the effect looks equivalent to removing the image of the closer object with scissors, sliding it to the left, and pasting it down again.

It is worth noting that the offset distance 46 can be used as a scaled measurement for determining the depth between the two actual objects 34, 33. The closer the objects are to one another, the smaller the offset distance 46 will be.

The offset distance 46 or "displacement effect" becomes most apparent when the depth between visually adjacent objects differs greatly. It also occurs more dramatically between objects in the foreground with differing focal depths. If all the objects in the artist's field of vision were in the distant background, or if all adjacent objects were of roughly the same focal depth, there would be virtually no discernable visual displacements.

It is also worth noting that, even without doing any tracing, one can determine the distance between the artist and the object by focusing on the object and simply measuring the width the transparent margin becomes at that moment. This transparent margin width can be used as a scaled measurement, in conjunction with the measured distance between the artist and the paper and the measured distance between the artist's two eyes, to calculate the distance between the artist and the object.

Exemplary Construction of Dish-Easel 22

While it is possible to calibrate this form using mathematics, we calculated all the curves using measurements from an actual half-sphere made of wood.

The first easel-like apparatus we built was made of 16-gauge wire. Our method of fabrication was simple. On a flat table we arranged length of wire into a grid with 90-degree angles. At each intersection the wires were pounded together and lashed with thinner wire. Then, to create the concave spherical crust shape we desired, we bent this flat square grid over the form of a sphere. The resulting shape looked like a concave square with pointy corners. FIG. 1A illustrates this shape well. We liked the aesthetic of that form and have used it for all subsequent easel-like apparatuses. One could widen the scope of the square to make it wrap even further around a sphere, or build an entire sphere and create a 360-degree drawing.

To create the easel-like apparatus 22 shown in these drawings we started by spinning a wooden dome with a 13" radius on a lathe. Then, using a pencil, a compass set to a fixed length of 2", and a metal straightedge with some flex we used simple rules of geometry to draw onto the dome's surface a line drawing of the grid with pointy corners.

Next, we constructed templates from poster-board that stood on each line of the grid at a perpendicular to the surface of the dome. These templates gave us the shapes to cut our sheet metal so it would also be oriented at a perpendicular to the surface of the sphere. When calibrating the templates, every piece of material used to make the templates should sit perpendicular to the surface of the dome. That means every tab of paper comprising a template should stand perpendicular, every tag board block supporting the tabs of paper should stand perpendicular, and the jig used to draw a perpendicular line on the templates at each intersection where slots will be cut should stand perpendicular to the surface of the dome.

Our method was to build each template from a collection of smaller (approximately 2.25") tabs of poster-board. We knew the radius of the dome and assumed the radius of the templates would be somewhat close to that radius. So we cut hundreds of tabs of paper (approximately 2.25" in length) with a 13" radius on their bottom edge. Then we cut hundreds of shorter length blocks (approximately 0.75") out of stiffer tag board that also had a 13" radius on their bottom edge; the side edges on the shorter blocks were cut to be perpendicular to the curve on the bottom edge. They resembled small keystones.

The keystone's job was to stand next to the lines of the grid, one on either side, perpendicular to the line, and support the 2.25" tabs of paper, similar to the way two bookends would support a book.

Figure 1C:
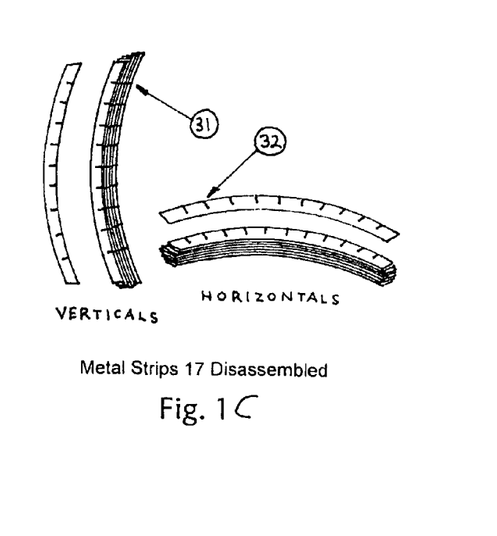
FIG. 1C is a perspective view of the vertical and horizontal components of the grid of the easel of FIGS. 1A-B in accordance with the invention.

Next we taped all the small keystones down in pairs surrounding the lines of the grid and then slid the 2.25" tabs of paper in-between the keystones. Next we glued the ends of each tab to the tabs surrounding it. When the glue dried we had our templates. Finally we needed to draw a mark on the templates for each intersection on the line grid. This mark also needed to be perpendicular to the surface of the dome and would be used to mark the location at which a slot 31, 32 would be cut later (FIG. 1C). These marks were added using the aid of a jig that slipped over the template and stood perpendicular to the surface of the dome.

After constructing our templates, we traced the curve of their bottom edges, as well as the marks for their slots, onto 25-gauge sheet metal and cut them out. After cutting the curve of the bottom edge from sheet metal, the top edge was scribed 1" above with a compass jig fixed at one inch. At this time a second line was also scribed but at half the distance, 0.5". This second line marked the middle of the metal strip and would determine where to stop cutting each slot. On all the templates that ran over the surface of the dome from east to west, if you will, we cut slots 32 from the top edge down to the middle line. On all the templates that ran over the surface of the dome from north to south we cut slots 31 from the bottom edge up to the middle line. This way, when fitted together, the two slots 31, 32 would meet each other halfway in a cross halving joint.

After cutting all the pieces out of sheet metal and cutting the slots on a band saw (FIG. 1C), we fit them together and welded them at each intersection; two welds per intersection, one on the front and one on the back. Finally we added a frame of angle iron 18 for rigidity with 2.5" of extra space 25 included on the right and left side of the frame. The 2.5" space 25 is crucial; if not present when you begin the drawing and shift the paper to look through the transparent margin 12, part of the angle iron frame 18 will appear in the transparent margin 12 and will block the object being drawn. We then welded on a base plate 19 with a threaded 0.25" hole 20 so the entire dish-easel 22 could be mounted on a commercial tripod 21. The hole 20 was drilled at the dish-easel's 22 center of gravity so that when it was sitting straight up its weight would be balanced above the tripod 21.

Exemplary Construction of the Curved Strips of Paper FIG. 2B

Similar to the dish-easel 22, these strips of paper FIG. 2B could be calculated with mathematics. However, we lifted the measurements for them directly from the dish-easel 22.

Again, using many small pieces of paper (approximately 3"×2.25" rectangles), we glued the pieces of paper together over the inner surface of the dish-easel 22, covering one row at a time. The paper was just wide enough to overlap both the sheet metal strips 17 that defined each row. Because of this, after each row was covered with paper we were able to trace from the back the precise edges of the sheet metal onto the paper. The paper was then trimmed to those precise edges and what remained was a template for the exact curve that fit inside each row. Once we had constructed all the templates, we transferred their shapes onto drawing paper, cut them out, and we had the finished curved strips FIG. 2B. These strips could be taped together and would form a portion of an approximate sphere FIG. 2A. It is an approximate sphere because its surface is kinked rather than perfectly smooth. Nonetheless, this approximate sphere FIG. 2A fits harmoniously into our dish-easel 22.

The invention is not limited to the above description. For example, it is discussed that the side margins of the drawing surface are drawn upon and later removed; however, one may turn one's head sideways on the head stabilizer and utilize the top or bottom margins instead. Alternatively, the head stabilizer may be made to rotate any number of degrees between horizontal ('normal') and vertical ('sideways'), and the side margin will change with respect to head position. The side in the term 'side margin' thus refers to the side of one's field of vision and not necessarily to the side of the paper or drawing surface. Additionally, although a head/chin rest is discussed above, other means for stabilizing the artist's head are contemplated, including but not limited to a bite plate (preferably pre-molded to the artist's teeth around which the artist can clench his jaws to precisely align and realign his vantage point while drawing), a clamp, a support structure suspended from a ceiling, or the like.

Having described the invention with respect to the above embodiments and drawings, it should be noted that the scope of the invention is not limited to the above description or what is shown in the drawings but rather is defined by the claims appearing hereinbelow and all such equivalents.

What is claimed is:

1. A system for creating perspective drawings on a spherical surface comprising:
    an easel having a radially symmetric curvature about a center point;
    a concave drawing surface adapted to fit inside said curvature of said easel;
    a rotatable head stabilizer disposable in proximity to said easel for positioning one of an artist's eyes substantially at said center point of said easel,
    wherein when the artist's eye is positioned at said center point and the artist looks at an object in the distance, an illusion of a transparent margin of said drawing surface overlaps the object to enable tracing of the distant object onto a real margin of said drawing surface.

2. A system for creating perspective drawings on a spherical surface according to claim 1, further comprising a means for manually locating said center point.

3. A system for creating perspective drawings on a spherical surface according to claim 2, wherein said center point locating means comprises at least one locating element perpendicular to said curvature, wherein when the artist places his eye at said center point, only an edge of said locating element is substantially visible.

4. A system for creating perspective drawings on a spherical surface according to claim 3, said locating element comprising a grid of strips of material perpendicular to said curvature.

5. A system for creating perspective drawings on a spherical surface according to claim 1, said drawing surface comprising substantially flat surface elements which, when assembled, form said concave drawing surface with substantially the same curvature as easel.

6. A system for creating perspective drawings on a spherical surface according to claim 5, said surface elements comprising curved longitudinal strips.

7. A system for creating perspective drawings on a spherical surface according to claim 5, said surface elements comprising interlocking polygons.

8. A system for creating perspective drawings on a spherical surface according to claim 1, said head stabilizer further comprising a chin rest.

9. A system for creating perspective drawings on a spherical surface according to claim 1, said head stabilizer further comprising a head clamp.

10. A system for creating perspective drawings on a spherical surface according to claim 1, said head stabilizer further comprising a bite plate graspable by the artist's jaws.

11. A system for creating perspective drawings on a spherical surface according to claim 1, said drawing surface comprising a single curved piece of material.

12. A method of creating perspective drawings on a drawing surface, comprising the steps of:
  a) providing an easel and a drawing surface;
  b) securely positioning one's head relative to the drawing surface;
  c) looking past an edge of the drawing surface at an object to be drawn and thereby creating an illusion of a transparent margin of the drawing surface overlapping the object;
  d) tracing the object onto the transparent margin of the drawing surface.

13. A method of creating perspective drawings on a drawing surface according to claim 12, further comprising the steps of:
  e) cutting off the traced upon margin on the drawing surface from step d), thereby creating a new transparent margin; and
  f) repeating steps b)-d) on the new transparent margin.

14. A method of creating perspective drawings on a drawing surface according to claim 13, further comprising the steps of:
  g) repeating steps b)-f) until all of the drawing surface is used; and
  h) reattaching the cut-up pieces of the drawing surface to form a complete image.

15. A method of creating perspective drawings on a drawing surface according to claim 12, wherein the drawing surface provided in said step a) is a concave drawing surface having radially symmetric curvature about a center point.

16. A method of creating perspective drawings on a drawing surface according to claim 15, wherein said step b) further comprises the step of positioning one of one's eyes substantially at the center point of the concave drawing surface.

17. A method of creating perspective drawings on a drawing surface according to claim 15, further comprising the step of i) providing on the easel at least one strip of material perpendicular to said curvature, substantially only the edge of the strip being visible by the artist when the artist's eye is at the center point.

18. A method of creating perspective drawings on a drawing surface according to claim 12, further comprising the steps of:
  j) repeating said steps c) and d) for at least two visually adjacent objects at different distances from the drawing surface, thereby creating an offset distance between the drawn images of the at least two visually adjacent objects; and
  k) using the offset distance in the drawing as a scaled measurement for determining the depth between the two visually adjacent objects,
  wherein the closer the objects are to each other, the smaller the offset distance in the drawing will be.

19. A method for creating perspective drawings on a drawing surface according to claim 12, further comprising the steps of:
  l) measuring the width of the transparent margin created in step c); and
  m) using said width as a scaled measurement for determining the distance between the artist and the object.

20. A system for creating perspective drawings on a surface comprising:
  an easel;
  a drawing surface adapted to fit on said easel;
  a rotatable head stabilizer disposable in proximity to said easel for positioning one of an artist's eyes at a predeterminable point in proximity to said easel,
  wherein when the artist's eye is stabilized relative to said easel and the artist looks at an object in the distance, an illusion of a transparent margin of said drawing surface overlaps the object to enable tracing of the distant object onto a real margin of said drawing surface.

21. A system for creating perspective drawings according to claim 20, wherein said head stabilizer is rotatable about one eye of the artist whose head is disposed in said head stabilizer.

22. A system for creating perspective drawings on a spherical surface comprising:
  an easel having a radially symmetric curvature about a center point;
  a concave drawing surface adapted to fit inside said curvature of said easel;
  a head stabilizer disposable in proximity to said easel for positioning one of an artist's eyes substantially at said center point of said easel; and
  a means for manually locating said center point,
  wherein when the artist's eye is positioned at said center point and the artist looks at an object in the distance, an illusion of a transparent margin of said drawing surface overlaps the object to enable tracing of the distant object onto a real margin of said drawing surface.

23. A system for creating perspective drawings on a spherical surface according to claim 22, wherein said center point locating means comprises at least one locating element perpendicular to said curvature, said locating element comprising a grid of strips of material perpendicular to said curvature,
  and wherein when the artist places his eye at said center point, only an edge of said locating element is substantially visible.

24. A system for creating perspective drawings on a spherical surface comprising:
  an easel having a radially symmetric curvature about a center point;
  a concave drawing surface adapted to fit inside said curvature of said easel, said drawing surface comprising substantially flat surface elements which, when assembled, form said concave drawing surface with substantially the same curvature as easel;
  a head stabilizer disposable in proximity to said easel for positioning one of an artist's eyes substantially at said center point of said easel,
  wherein when the artist's eye is positioned at said center point and the artist looks at an object in the distance, an illusion of a transparent margin of said drawing surface overlaps the object to enable tracing of the distant object onto a real margin of said drawing surface.

* * * * *